(12) United States Patent
Liu et al.

(10) Patent No.: US 10,249,213 B2
(45) Date of Patent: Apr. 2, 2019

(54) MULTI-NODE MOTION MEASUREMENT AND ANALYSIS SYSTEM

(71) Applicant: Beijing Noitom Technology Ltd., Xicheng District, Beijing (CN)

(72) Inventors: Haoyang Liu, Beijing (CN); Ruoli Dai, Beijing (CN); Peter Gauthier, Beijing (CN)

(73) Assignee: Beijing Noitom Technology Ltd., Beijing (CN)

( * ) Notice: Subject to any disclaimer, the term of this patent is extended or adjusted under 35 U.S.C. 154(b) by 272 days.

(21) Appl. No.: 15/208,028

(22) Filed: Jul. 12, 2016

(65) Prior Publication Data
US 2017/0110026 A1 Apr. 20, 2017

Related U.S. Application Data

(63) Continuation of application No. PCT/CN2014/071006, filed on Jan. 21, 2014.

(51) Int. Cl.
*G09B 19/00* (2006.01)
*A63B 71/06* (2006.01)
*A63B 69/36* (2006.01)

(52) U.S. Cl.
CPC ...... *G09B 19/0038* (2013.01); *A63B 69/3608* (2013.01); *A63B 71/0622* (2013.01);
(Continued)

(58) Field of Classification Search
CPC ............ G09B 19/0038; A63B 69/3608; A63B 2071/0636; A63B 2220/34;
(Continued)

(56) References Cited

U.S. PATENT DOCUMENTS

| 7,411,512 B2 * | 8/2008 | Domeier | G01C 21/08 324/244 |
| 7,689,378 B2 * | 3/2010 | Kolen | G01C 17/00 702/150 |

(Continued)

FOREIGN PATENT DOCUMENTS

| CN | 1790235 | 6/2006 |
| CN | 201286963 | 8/2009 |

(Continued)

OTHER PUBLICATIONS

International Search Report (and English translation) issued in PCT Application PCT/CN2014/071006 dated Oct. 29, 2014; 8 pgs.
(Continued)

*Primary Examiner* — Mohamed Charioui
*Assistant Examiner* — Catherine T. Rastovski
(74) *Attorney, Agent, or Firm* — Harness, Dickey & Pierce, P.L.C.; Anthony G. Fussner

(57) ABSTRACT

A multi-node motion measurement and analysis system comprises at least one motion measurement module and a receiver unit. The motion measurement module is bound to a hand-held sports appliance through an adjustable fixture or being bound to a human body. A binding position on the human body is rearrangeable based on different measurement requirements. The motion measurement module comprises a sensor module configured to measure information of acceleration, angular velocity and magnetic force, a first microprocessor module connected to the sensor module and configured to generate information of orientation, and a first RF module configured to receive the information of acceleration, angular velocity, magnetic force and orientation and transmit the received information to the receiver unit. The receiver unit generates motion information according to the information of acceleration, angular velocity, magnetic force
(Continued)

and orientation, and calibrates the motion measurement module bound to different positions on the human body.

12 Claims, 10 Drawing Sheets

(52) U.S. Cl.
CPC ... *A63B 2071/0636* (2013.01); *A63B 2220/34* (2013.01); *A63B 2220/40* (2013.01); *A63B 2220/803* (2013.01); *A63B 2220/833* (2013.01); *A63B 2220/836* (2013.01)

(58) Field of Classification Search
CPC .......... A63B 2220/40; A63B 2220/803; A63B 2220/833; A63B 2220/836
See application file for complete search history.

(56) References Cited

U.S. PATENT DOCUMENTS

| | | |
|---|---|---|
| 8,170,656 B2 | 5/2012 | Tan et al. |
| 8,589,114 B2 | 11/2013 | Papadourakis |
| 2006/0184336 A1 | 8/2006 | Kolen |
| 2008/0214360 A1 | 9/2008 | Stirling et al. |
| 2010/0049468 A1 | 2/2010 | Papadourakis |
| 2013/0041617 A1 | 2/2013 | Pease et al. |
| 2013/0267335 A1* | 10/2013 | Boyd .................... A63B 69/36 473/222 |
| 2013/0271602 A1* | 10/2013 | Bentley ................... H04N 7/18 348/143 |

FOREIGN PATENT DOCUMENTS

| | | |
|---|---|---|
| CN | 201600570 U | 10/2010 |
| CN | 20180717 U | 4/2011 |
| CN | 102349037 | 2/2012 |
| CN | 202218347 U | 5/2012 |
| CN | 103442607 | 12/2013 |
| CN | 103759739 | 4/2014 |

OTHER PUBLICATIONS

Chinese Office action (and English translation) issued in Chinese Patent Application 201410027282.4 dated Dec. 26, 2014; 7 pgs.

* cited by examiner

MULTI-NODE MOTION MEASUREMENT AND ANALYSIS SYSTEM

CROSS-REFERENCE TO RELATED APPLICATION

This application is a continuation of and claims the benefit and priority of PCT International Application No. PCT/CN2014/071006 filed Jan. 21, 2014 (published Jul. 30, 2015 as WO2015/109442).

FIELD

The present disclosure generally relates to the technical field of motion measurement, and particularly, to a multi-node motion measurement and analysis system.

BACKGROUND

This section provides background information related to the present disclosure which is not necessarily prior art.

In recent years, the motion capture technology is widely used in motion capture and motion analysis for sports. The motion capture technology can digitally record actions of the object, and the common motion capture technology at present mainly includes an optical motion capture and an inertial sensor based motion capture.

The optical motion capture system usually includes 4 to 32 cameras which are arranged around an object to be measured, and a motion range of the object is within the overlapped area of the cameras. Some special reflective points or luminous points are affixed to the key parts of the object to be measured, to serve as markers for visual identification and processing. After the system calibration, the cameras continuously shoot the motion of the object to be measured, store the image sequence, analyze and process the stored image sequence, and calculate the spatial position of each marker point at a certain moment, so as to obtain the accurate trajectory. The advantage of the optical motion capture is that there is no limitation of mechanical devices, wired cables, etc., thereby allowing a large motion range of the object, and the sampling frequency is high, and thus the optical motion capture may meet the requirements of most sports measurements. For this system, however, the price is high, the calibration is tedious, and only the object motion in the overlapped area of the cameras can be captured. In addition, in case of complex motion, the markers are easily confused and occluded to cause a wrong result.

The traditional mechanical inertial sensors have been applied for the navigations of aircrafts and ships for a long time. As the Micro Electro Mechanical System (MEMS) technology develops rapidly and the technology of micro inertial sensor continues to mature, in recent years, people start attempting the motion capture based on micro inertial sensor. The basic method is that the object to be measured is connected to an Inertial Measurement Unit (IMU) which moves with it. The inertial measurement unit usually includes a micro accelerometer (measuring an acceleration signal) and a micro gyroscope (measuring an angular velocity signal), and the position information and the orientation information of the object to be measured can be obtained through a quadratic integration of the acceleration signal and an integration of the gyro signal. Due to the application of the MEMS technology, the size and weight of the IMU may be very small, thus the influence on the motion of the object to be measured is slight, and the site requirement is low, the allowed motion range is large, and the system cost is low.

Due to small volume, light weight, low price, etc., the MEMS inertial sensor presently has been applied in the capture and analysis of some sports, such as a golf swing motion. Specifically, a sensor module is mounted to a hand-held sports appliance through a certain fixture structure, and the sensor module moves with the apparatus during motion, captures the motion of the apparatus and wirelessly transmits the captured data to a certain terminal receiving device. This mode based on the single-node motion capture has a low cost, but it only captures the motion of a sports appliance, and is unable to provide the motion data of a human body.

U.S. Pat. No. 7,689,378 reveals a highly miniaturized motion capture system containing an MEMS sensor, and it can be embedded into a sports appliance without influencing the motion characteristics thereof. The motion capture module includes one tri-axial accelerometer, one tri-axial gyroscope and one tri-axial magnetometer, wherein the tri-axial accelerometer and the tri-axial gyroscope can measure the three-dimensional displacement and the three-dimensional orientation of the module relative to the external fixed coordinate system, and the tri-axial magnetometer can measure an absolute space of the module in conjunction with the tri-axial accelerometer based on the local geomagnetic vector and gravity field. The solution is implemented by integrating a single sensor module to a sports appliance (e.g., golf clubs), so as to capture the trajectory of the sports appliance and wirelessly transmit it to a receiver. In the mode based on the single-node motion capture of the technical solution, the sensor module is semi-permanently mounted and fixed to the sports appliance in the mounting manner of mechanical integration; and each sports appliance needs to be integrated with a sensor module for a sport requiring multiple sports appliance, thus the cost is increased.

U.S. Pat. No. 8,589,114 discloses a single-node motion capture and analysis system, wherein a sensor unit comprising a tri-axial accelerometer and a tri-axial gyroscope is adjustably mounted onto a surface of a sports appliance; a motion of the sports appliance is captured, and one or more motion characteristic values are determined through processing of motion data; the motion data and motion characteristic values are wirelessly transmitted to a display unit, so as to be displayed in a graph form. An adjustable sensor mounting mode is adopted in the solution, so that the sensor unit can be flexibly mounted and removed, which facilitates the actual usage. But under the single-node motion capture mode of this solution, the sensor unit only is mounted to the sports appliance to analyze the motion of the sports appliance that is moving, and not capable of providing motion information of a human body.

SUMMARY

This section provides a general summary of the disclosure, and is not a comprehensive disclosure of its full scope or all of its features.

The present disclosure provides a multi-node motion measurement and analysis system to assist the user to establish a correct movement, and arrange positions and the number of the motion measurement modules flexibly upon the actual demand, so that the system can acquire the required useful motion information of the human body and the sports appliance using just a few motion measurement modules, thereby reducing the cost.

Embodiments of the present disclosure provide a multi-node motion measurement and analysis system comprising:

at least one motion measurement module and a receiver unit. The motion measurement module is bound to a sports appliance through an adjustable fixture or bound to a human body. A binding position on the human body is rearrangeable based on different measurement requirements. The motion measurement module comprises a sensor module configured to measure information of acceleration and angular velocity of the motion measurement module, a first microprocessor module connected to the sensor module and configured to generate information of inclination angle according to the information of acceleration and angular velocity, a first RF module connected to the first microprocessor module and configured to receive the information of acceleration, angular velocity and inclination angle and transmit the received information to the receiver unit.

The receiver unit receives the information of acceleration, angular velocity, etc., transmitted from the first RF module in each motion measurement module to generate motion information of the human body or the sports appliance, such as trajectory, speed, angle and motion sequence, according to the information of acceleration, angular velocity, etc.; and calibrates the motion measurement module bound to different positions on the human body.

Embodiments of the present disclosure may have the following beneficial effect: by using the multi-node motion measurement and analysis system of the present disclosure, motion information of the sports appliance and the human body can be simultaneously measured, so as to obtain the coordinated movement of the human body and the sports appliance and assist the user to establish a correct movement. In addition, the positions and number of the motion measurement modules can be arranged flexibly upon the actual demand, so that the system can acquire the required useful motion information of the human body and the sports appliance using just a few motion measurement modules, thereby reducing the cost.

Other aspects, advantages, and novel features will become more apparent from the following detailed description when taken in conjunction with the accompanying drawings.

DRAWINGS

In order to more clearly describe the technical solutions in the embodiments of the present disclosure or the prior art, accompanying drawings to be used in the descriptions of the embodiments or the prior art will be briefly introduced as follows. Obviously, the accompanying drawings in the following descriptions just illustrate some embodiments of the present disclosure, and a person skilled in the art can obtain other accompanying drawings from them without paying any creative effort.

DESCRIPTION

The technical solutions in the embodiments of the present disclosure will be clearly and completely described as follows with reference to the accompanying drawings of the embodiments of the present disclosure. Obviously, those described herein are just parts of the embodiments of the present disclosure rather than all the embodiments. Based on the embodiments of the present disclosure, any other embodiment obtained by a person skilled in the art without paying any creative effort shall fall within the protection scope of the present disclosure.

Figure 1:
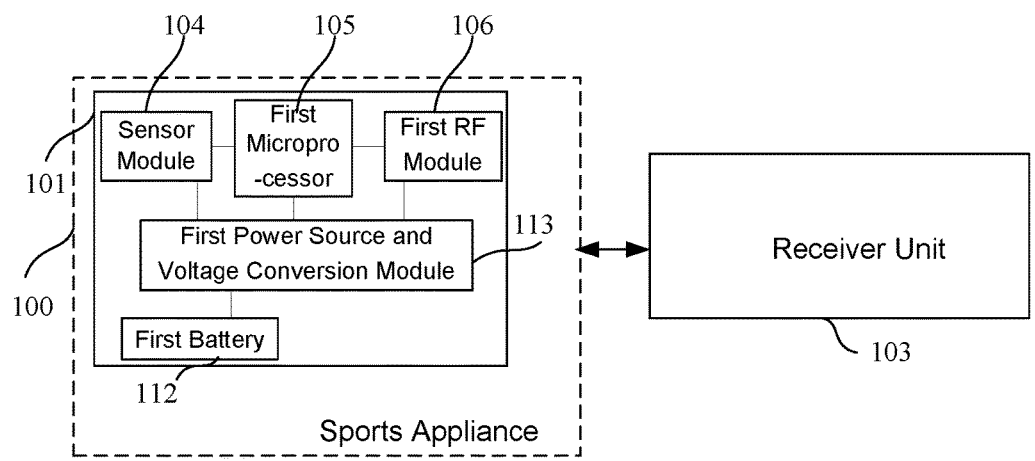
FIG. 1 is a block diagram of an example of a multi-node motion measurement and analysis system according to an embodiment of the present disclosure.
Figure 2:
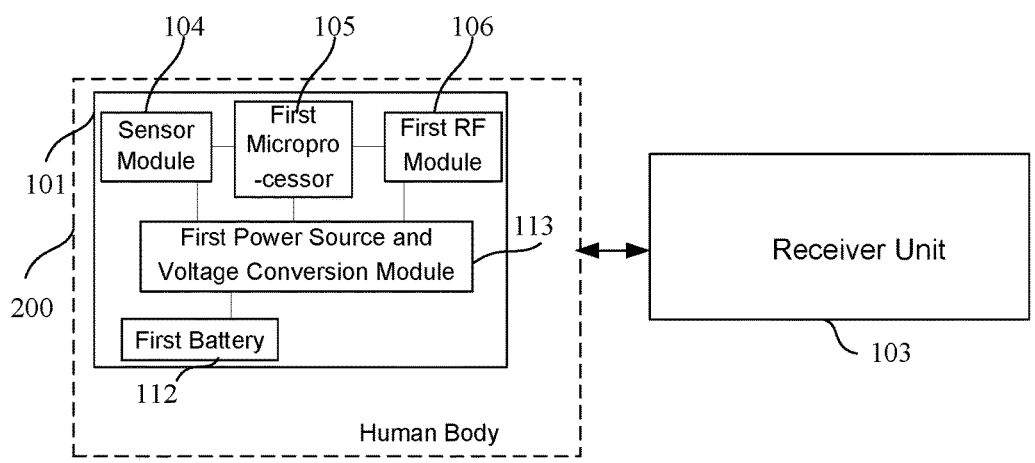
FIG. 2 is a block diagram of an example of a multi-node motion measurement and analysis system according to an embodiment of the present disclosure.

As illustrated in FIGS. 1 and 2, the embodiments of the present disclosure provide a multi-node motion measurement and analysis system which comprises: at least one motion measurement module 101 and a receiver unit 103. The motion measurement module 101 is bound to a sports appliance 100 through an adjustable fixture or bound to a human body 200. A binding position of the motion measurement module 101 on the human body 200 can be rearranged based on different measurement requirements.

The motion measurement module 101 is mounted to the sports appliance 100 by adjusting the adjustable fixture that can be fixed to any position on the sports appliance. The motion measurement module 101 may be separate from the adjustable fixture, so that the motion measurement module 101 mounted on the sports appliance 100 can be conveniently mounted to any part of the human body 200. As illustrated in FIG. 1, the motion measurement module 101 is bound to the sports appliance 100 through the adjustable fixture, and as illustrated in FIG. 2, the motion measurement module 101 is bound to the human body 200.

In the embodiments of the present disclosure, the motion information of the human body and the sports appliance can be measured just through using one motion measurement module that can be mounted to the human body or the sports appliance at will, and the position of the motion measurement module is flexibly arranged upon the actual demand, thus the cost is reduced.

Figure 3:
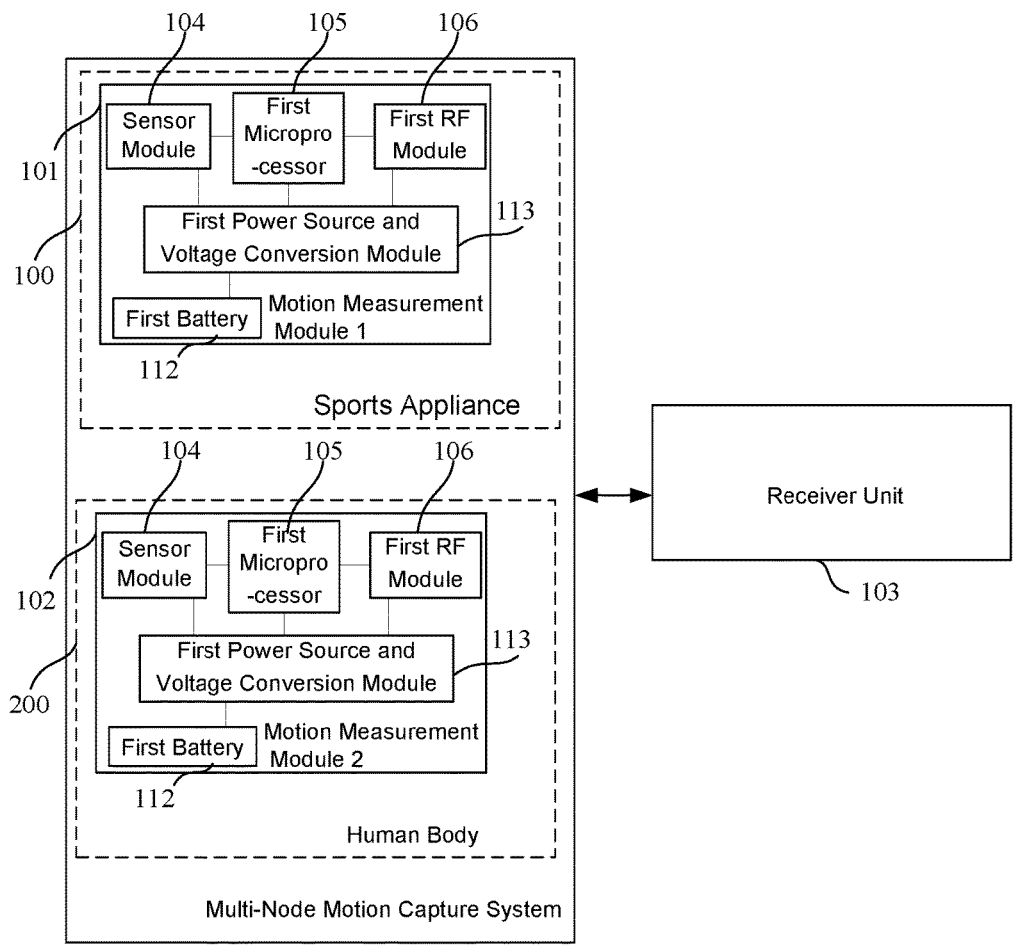
FIG. 3 is a block diagram of an example of a multi-node motion measurement and analysis system according to an embodiment of the present disclosure.

As illustrated in FIG. 3, there are two motion measurement modules, wherein one motion measurement module 101 is bound to the sports appliance 100, and the other motion measurement module 102 is bound to the human body 200. In addition, a binding position of the motion measurement module 102 on the human body 200 can be rearranged based on different measurement modes.

In an embodiment, the number of the motion measurement modules 102 bound to the human body 200 is updated according to different measurement modes. Thus, more motion information of human body parts can be obtained with small number of the motion measurement modules and low cost. For updating according to different measurement modes, the motion measurement modules 102 are required to be wireless motion measurement modules, and each motion measurement module on the human body is wirelessly connected to the receiver unit 103. In the current art, multiple sensors bound to the human body are connected, in a wired connection, to a central control module bounded to the human body, respectively; and motion measurement information of each sensor is transmitted through the central control module; while the number of the ports of the central control module is limited, thus the number of the sensors connected to the central control module is limited, and if any sensor is added, the receiver unit 103 does not have a function of processing data measured by the added sensor. In the present application, each motion measurement modules 102 is wirelessly connected to the receiver unit 103 (e.g., through a Radio Frequency (RF) module), without being limited by the ports. In the present application, the receiver unit 103 can transmit and process data of up to twenty motion measurement modules; and the software upgrade function is supported, thus the number of the motion measurement modules in the system can be conveniently updated upon demand.

Figure 4:
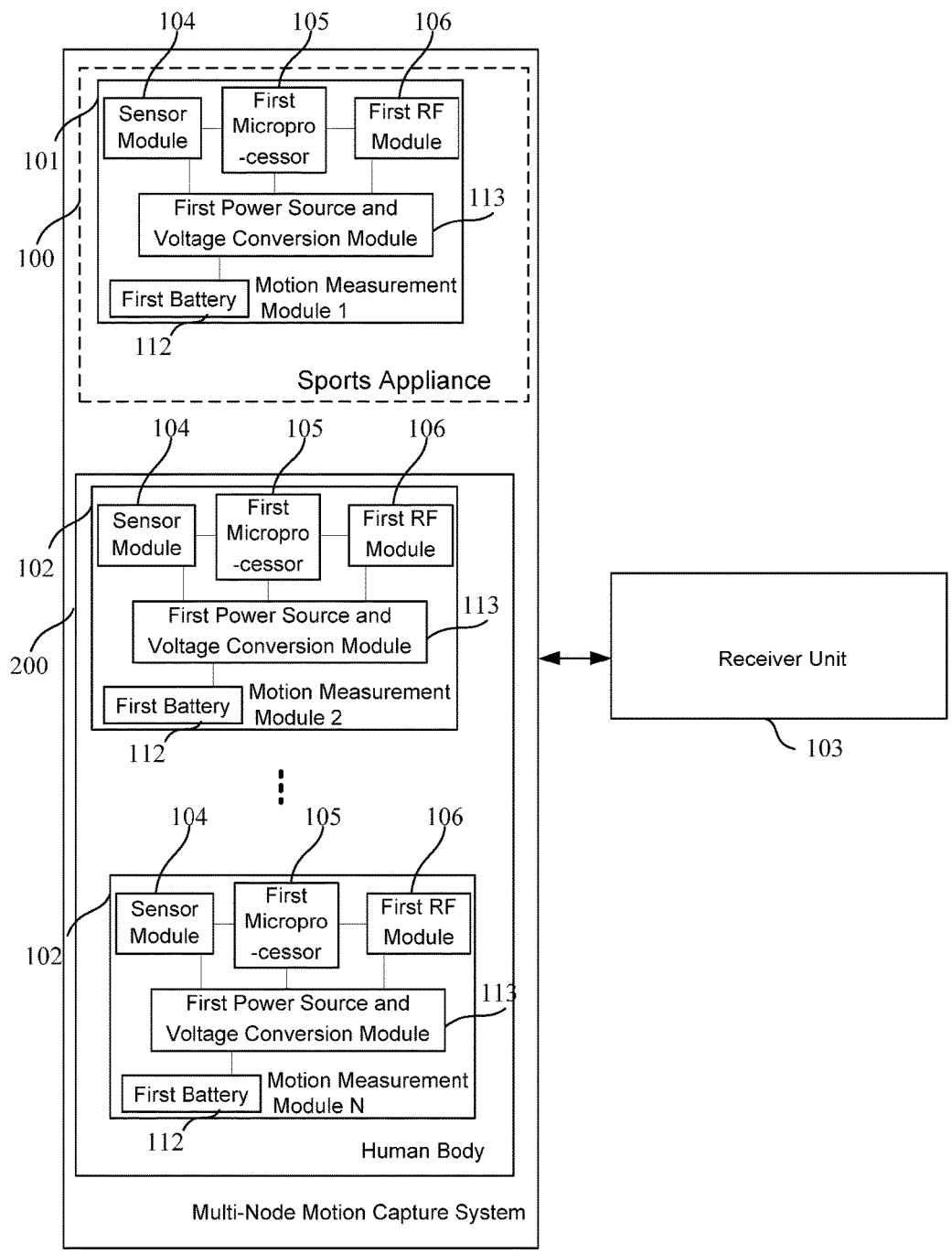
FIG. 4 is a block diagram of an example of a multi-node motion measurement and analysis system according to an embodiment of the present disclosure.

As illustrated in FIG. 4, there may be multiple motion measurement modules, wherein one motion measurement module 101 is bound to the sports appliance 100; while other motion measurement modules 102 are bound to the human body 200, and their binding positions on the human body 200 can be rearranged based on different measurement modes. The motion measurement module 101 and the motion measurement modules 102 together construct a multi-node motion measurement and analysis system.

Under the condition that there are two or more motion measurement modules in the embodiments as illustrated in FIGS. 3 and 4, one of the motion measurement modules is mounted on the sports appliance by being bound thereto through an adjustable fixture or a mechanical integration.

As illustrated in FIGS. 1 to 4, each of the motion measurement module 101 and the motion measurement module 102 comprises a sensor module 104, a first microprocessor module 105 and a first RF module 106. The sensor module 104 is configured to measure information of acceleration, angular velocity and magnetic force of the motion measurement module; the first microprocessor module 105 is connected to the sensor module 104 and configured to generate information of orientation according to the information of acceleration, angular velocity and magnetic force; and the first RF module 106 is connected to the first microprocessor module and configured to receive and transmit the information of acceleration, angular velocity, magnetic force and orientation to the receiver unit 103.

In an embodiment, as illustrated in FIGS. 1 to 4, each of the motion measurement module 101 and the motion measurement module 102 may further comprise a first battery 112, and a first power source and voltage conversion module 113 through which the first battery 112 supplies power to the sensor module 104, the first microprocessor module and the first RF module, and through which a USB power source can charge the first battery 112.

The receiver unit 103 receives information of acceleration, angular velocity, (or) magnetic force and orientation transmitted from the first RF module 106 in each motion measurement module, and generates motion information of the human body and the sports appliance, such as trajectory, linear/angular velocity, angle, displacement and motion sequence, according to the received information of acceleration, angular velocity, (or) magnetic force and orientation.

The receiver unit 103 may be disposed away from the vicinity of human body or bound to the human body, or integrated with a certain motion measurement module bound to the human body.

Under the condition that the multi-node motion measurement and analysis system as illustrated in FIGS. 1 and 2 comprises only one motion measurement module, the sensor module 104 can just measure the acceleration and the angular velocity of the motion measurement module, without needing to measure any information of magnetic force, and then the first microprocessor module 105 generates the information of orientation according to the acceleration and the angular velocity. The receiver unit 103 receives information of acceleration, angular velocity and orientation transmitted from the first RF module 106 in the motion measurement module, and generates motion information of the human body and the sports appliance, such as trajectory, linear/angular velocity, angle, displacement and motion sequence, according to the received information of acceleration, angular velocity and orientation.

Figure 5:
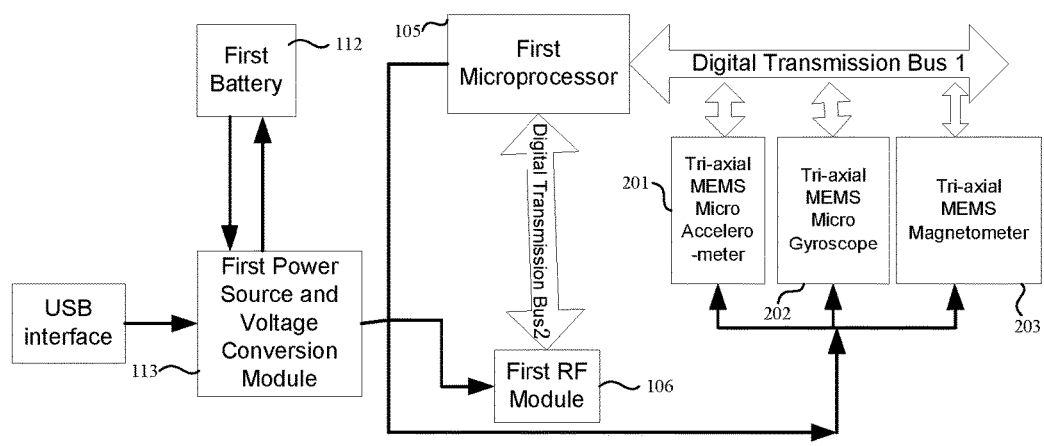
FIG. 5 is a structure block diagram of an example of a motion measurement module according to an embodiment of the present disclosure.
Figure 6:
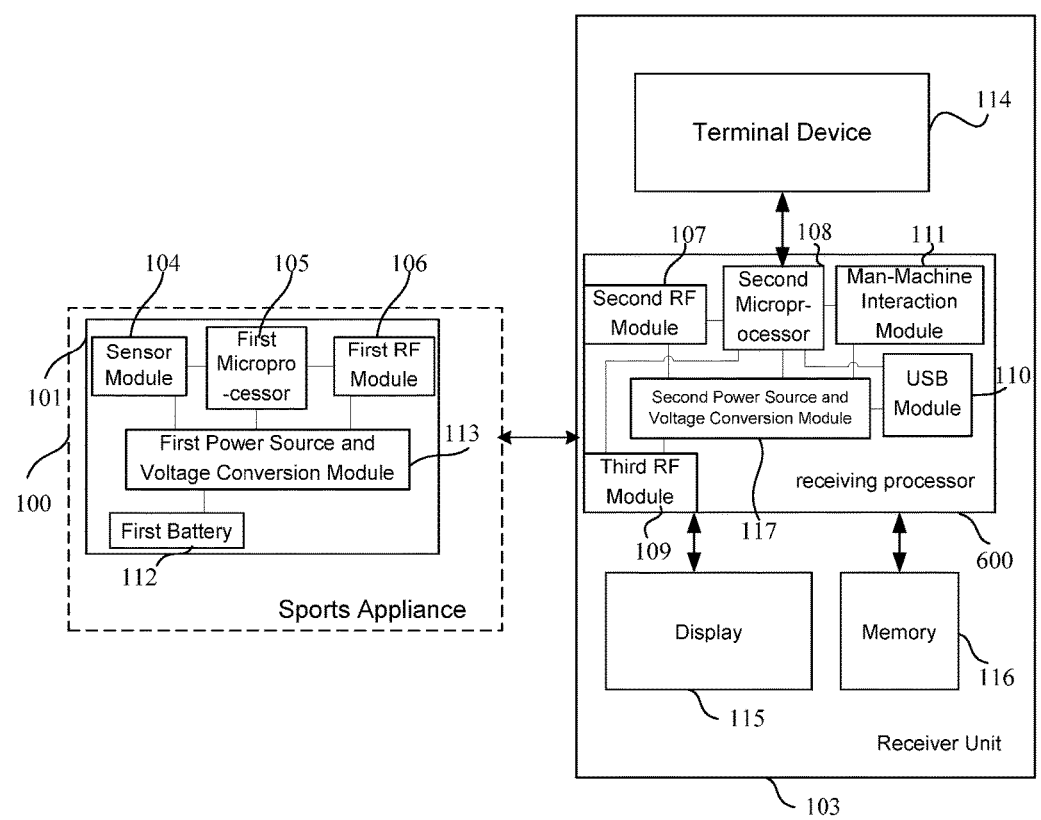
FIG. 6 is a block diagram of an example of a multi-node motion measurement and analysis system according to an embodiment of the present disclosure.
Figure 7:
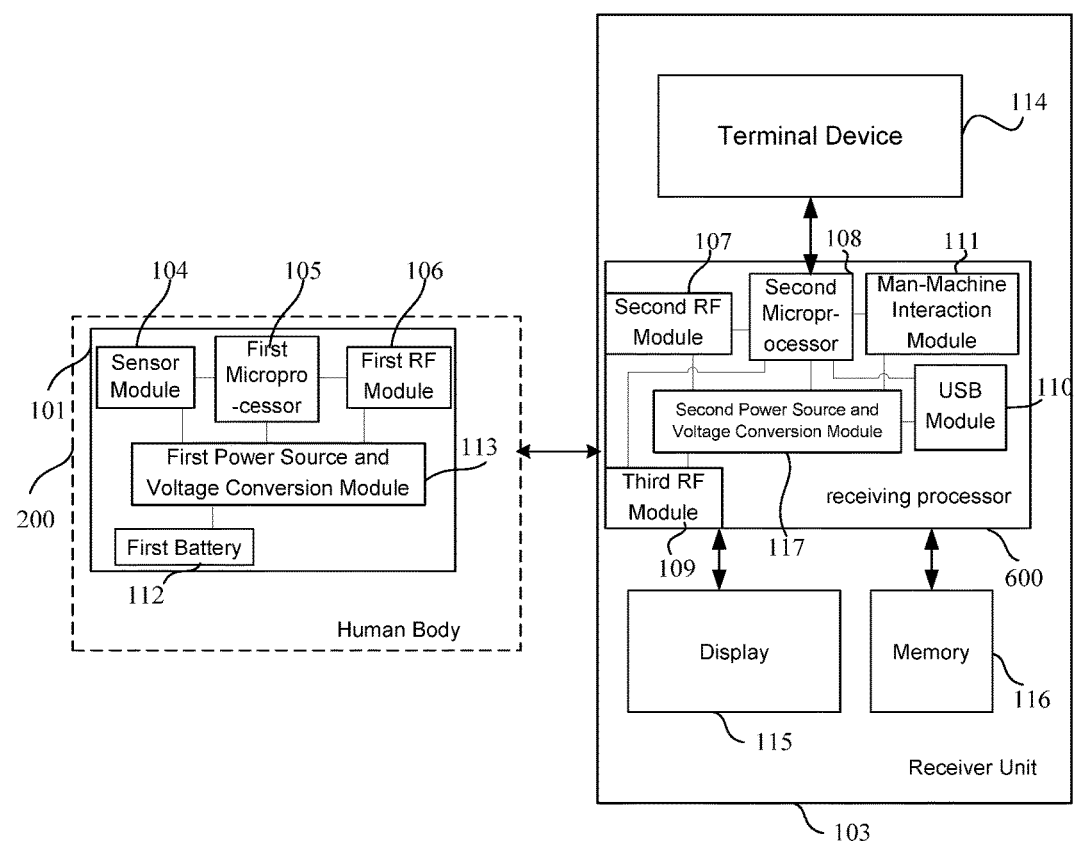
FIG. 7 is a block diagram of an example of a multi-node motion measurement and analysis system according to an embodiment of the present disclosure.
Figure 8:
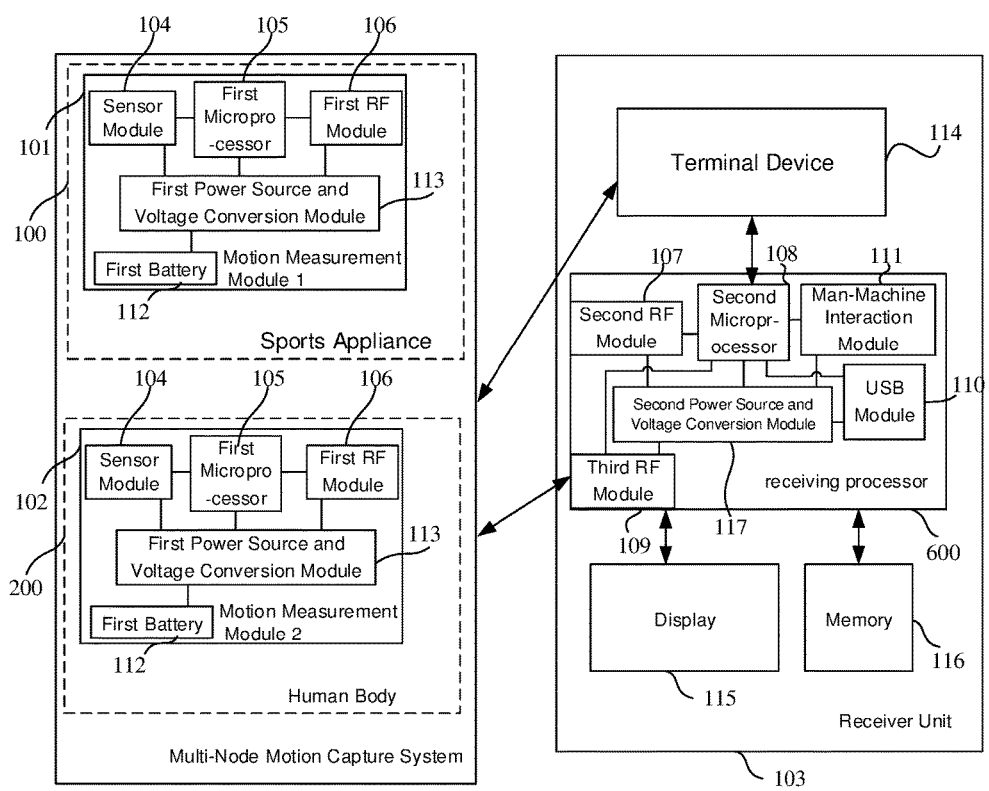
FIG. 8 is a block diagram of an example of a multi-node motion measurement and analysis system according to an embodiment of the present disclosure.
Figure 9:
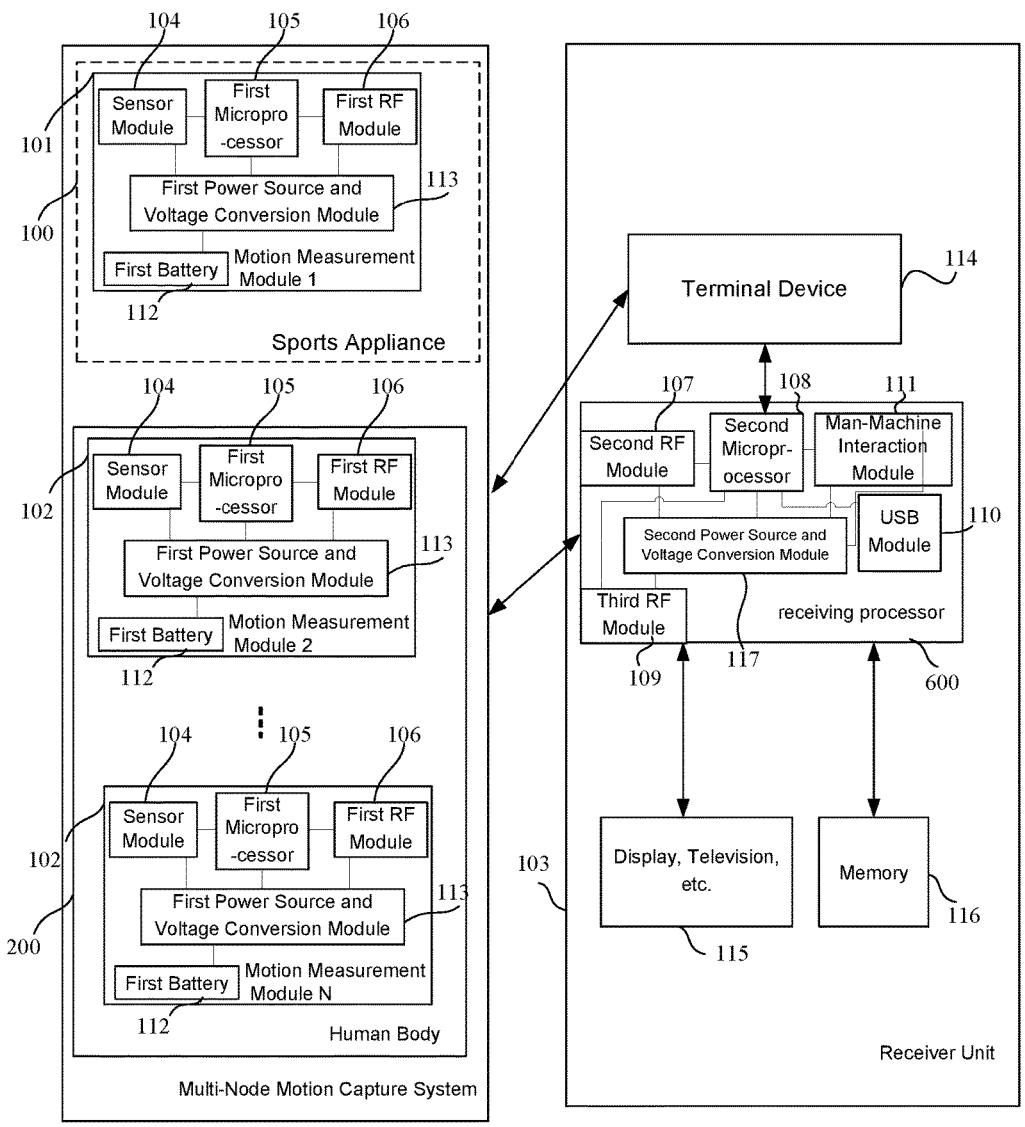
FIG. 9 is a block diagram of an example of a multi-node motion measurement and analysis system according to an embodiment of the present disclosure.

In an embodiment, as illustrated in FIG. 5, the sensor module 104 comprises a tri-axial MEMS micro accelerometer 201, a tri-axial MEMS micro gyroscope 202 and a tri-axial MEMS magnetometer 203. The tri-axial MEMS micro accelerometer 201 measures an acceleration of the motion measurement module, the tri-axial MEMS micro gyroscope 202 measures an angular velocity of the motion measurement module, and the tri-axial MEMS magnetometer 203 measures a magnetic force of the motion measurement module. The first microprocessor module 105 generates a static three-dimensional orientation angle of the motion measurement module according to a gravity vector measured by the tri-axial MEMS micro accelerometer 201 and a geomagnetic vector measured by the tri-axial MEMS magnetometer 203; generates a dynamic three-dimensional orientation angle of the motion measurement module according to the angular velocity measured by the tri-axial MEMS micro gyroscope 202; and corrects the dynamic three-dimensional orientation angle by using the static three-dimensional orientation angle of the motion measurement module, and thus obtains information of orientation of the motion measurement module. The motion sequence of each part of the human body and the sports appliance includes an order for an acceleration of each part of the human body and the sports appliance to reach a peak in a time axis, a time interval between the peaks, and an amplitude of the peak of the acceleration; an order for a velocity of each part of the human body and the sports appliance to reach a peak in a time axis, a time interval between the peaks, and an amplitude of the peak of the velocity; and an order for an angle of each part of the human body and the sports appliance to reach a peak in a time axis, a time interval between the peaks, and an amplitude of the peak of the angle.

Figure 11:
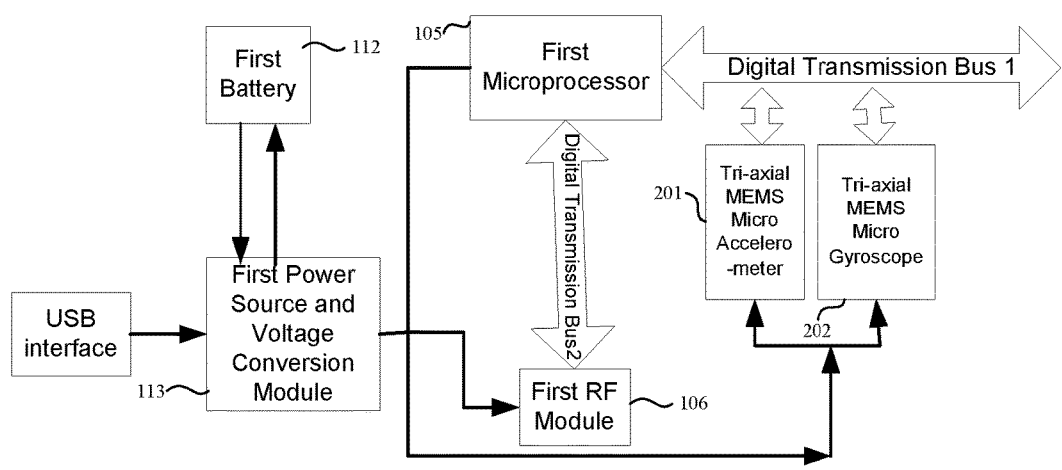
FIG. 11 is a block diagram of a structure of an example of a motion measurement module according to an embodiment of the present disclosure.

In an embodiment, under the condition as illustrated in FIGS. 1 and 2 that the multi-node motion measurement and analysis system has only one motion measurement module, as illustrated in FIG. 11, the sensor module 104 comprises the tri-axial MEMS micro accelerometer 201 and the tri-axial MEMS micro gyroscope 202. The tri-axial MEMS micro accelerometer 201 measures an acceleration of the motion measurement module, and the tri-axial MEMS micro gyroscope 202 measures an angular velocity of the motion measurement module. The first microprocessor module 105 generates a static inclination angle of the motion measurement module according to the gravity vector measured by the tri-axial MEMS micro accelerometer 201; and generates a dynamic three-dimensional orientation angle of the motion measurement module according to the angular velocity measured by the tri-axial MEMS micro gyroscope 202.

The binding position of the motion measurement module on the human body can be rearranged based on different measurement modes which are corresponding to different measurement requirements. For example, the present measurement may require measuring motion conditions of the head, the next measurement may require measuring motion conditions of the shoulder, and a further measurement may require measuring motion conditions of the leg. The motion measurement module may be mounted to different parts to be measured based on the measurement requirement. When each motion measurement module is initially mounted or its mounting position is changed, its actual mounting position needs to be specified on a man-machine interaction interface of the receiver unit.

The receiver unit 103 can also calibrate the motion measurement module bound to different positions on the human body. As mentioned previously, in the case that each motion measurement module is initially mounted or its mounting position is changed, the receiver unit 103 shall be used to calibrate the motion measurement module moved to a different position or a newly added motion measurement module. After the positions and the number of the motion measurement modules are specified at the man-machine interaction interface of the receiver unit 103, the receiver unit 103 provides corresponding calibration procedure guidance according to the mounting positions and the number of the motion measurement modules, so that the user may complete the specified calibration posture(s) under the guidance to eliminate mounting errors of those modules.

The principle of calibration is to remain the mounting part of a motion measurement module in a known orientation, and then determine a deviation of the mounting orientation of the motion measurement module by comparing a measured orientation of the motion measurement module and the known orientation of the human body part. For example, as to a single motion measurement module mounted on the hip, the human calibration posture is a natural standing. For another example, as to a single motion measurement module mounted on the back, in order that the two shoulders are horizontal and the two hands hold a Pad, the human calibration posture is an orientation at which the two shoulders are horizontal and the two hands horizontally stretch forward to hold a Pad. For still another example, when a module is mounted at a wrist, the standard calibration posture may be an orientation at which the hand horizontally extends forward with a palm down.

The receiver unit 103 is also configured to calibrate the generated motion information according to the biomechanical constraints of the human body and the external constraints.

The receiver unit 103 may be a terminal device, or comprise a receiving processor and a terminal device, wherein the terminal device includes a smart phone, a palm computer, a tablet computer, a television, or a PC. An embodiment where the receiver unit 103 is a terminal device and an embodiment where the receiver unit 103 comprises a receiving processor and a terminal device will be described as follows respectively.

1. The Case that the Receiver Unit 103 is a Terminal Device.

During implementation, the terminal device may receive sensor information such as the acceleration and angular velocity transmitted from the first RF module 106 in each motion measurement module through Bluetooth or other wireless module, generates motion information according to the received sensor information, and compares current motion information of the human body and the sports appliance with preset reference motion information to generate a result of comparison.

In an embodiment, the terminal device comprises a man-machine interaction module and transmits the result of comparison to the man-machine interaction module, which gives an audible and visual alert or a vibration alert according to the result of comparison. In an embodiment, the man-machine interaction module may also be integrated with a certain motion measurement module.

In an embodiment, the terminal device further comprises: a display and a memory. The display may display motion information of the human body and the sports appliance, such as trajectory, orientation, motion sequence and motion speed. The memory may store the motion information and a standard reference trajectory or motion sequence, so as to provide guidance and feedback in real time on the motion of the human body according to the standard reference trajectory or motion sequence.

The multi-node motion measurement and analysis system in the embodiments of the present disclosure may achieve time synchronization between the respective motion measurement modules, such as a point-to-point synchronization.

In an embodiment, a certain motion measurement module (e.g., mounted on the sports appliance or the human body) transmits a synchronization command to other motion measurement modules so as to perform a time synchronization. According to the synchronization command, the terminal device can determine the motion sequence of each part of the human body based on the data of each motion measurement module received in real time.

In an embodiment, the synchronization may also be initiated by the terminal device, i.e., the terminal device transmits a synchronization command to all of the motion measurement modules to perform synchronization. According to the synchronization command, the terminal device can determine the motion sequence of each part of the human body based on the data of each motion measurement module received in real time.

2. The Case that the Receiver Unit 103 Comprises a Receiving Processor 600 and a Terminal Device 114.

As illustrated in FIGS. 6 to 9, the receiving processor 600 comprises a second RF module 107, a second microprocessor module 108, a third RF module 109 and a USB module 110.

The second RF module 107 is configured to receive sensor information of each motion measurement module, such as acceleration and angular velocity, transmitted from the first RF module 106 in the motion measurement module, and transmits the sensor information to the second microprocessor module 108.

The second microprocessor module 108 is connected to the second RF module 107 and configured to generate motion information according to the sensor information, and transmit the motion information to the terminal device 114 through the third RF module 109 or the USB module 110. The second microprocessor module 108 may also compare current motion information of the human body and the sports appliance with preset reference motion information to generate a result of comparison.

The receiver unit 103 may further comprise a man-machine interaction module 111, which receives the result of comparison from the second microprocessor module 108, and provides an audible and visual alert or a vibration alert according to the result of comparison. In an embodiment, the man-machine interaction module may also be integrated with a certain motion measurement module.

The receiver unit 103 may further comprise a display 115 and a memory 116. The display 115 (e.g., a television) may display motion information of the human body and the sports appliance, such as trajectory, orientation, motion sequence and motion speed. The memory 116 may store the motion information and a standard reference trajectory or motion sequence, so as to provide guidance and feedback in real time to the motion of the human body according to the standard reference trajectory or motion sequence.

In an embodiment, the second microprocessor module 108 does not perform any complex processing of the information of acceleration, angular velocity, magnetic force and orientation, but transmit them to the terminal device 114 for a processing through the third RF module 109 or the USB module 110 after a simple processing such as package. The terminal device 114 generates motion information according to the sensor information, and compares the motion information with the preset reference motion information to generate a result of comparison.

In an embodiment, the receiver unit 103 may further comprise a second power source and voltage conversion module 117, wherein, the second RF module 107, the second microprocessor module 108, the third RF module 109 and the man-machine interaction module 111 are powered through the second power source and voltage conversion module 117.

The multi-node motion measurement and analysis system in the embodiments of the present disclosure may achieve time synchronization between the respective motion measurement modules, such as a point-to-point synchronization.

In an embodiment, a certain motion measurement module (e.g., mounted on the sports appliance or the human body) transmits a synchronization command to other motion measurement modules so as to perform a time synchronization. According to the synchronization command, the receiving processor 600 or the terminal device 114 can determine the motion sequence of each part of the human body based on the data of each motion measurement module received in real time.

In an embodiment, the synchronization may also be initiated by the receiving processor 600, i.e., the receiving processor 600 transmits a synchronization command to all of the motion measurement modules to perform synchronization. According to the synchronization command, the receiving processor 600 or the terminal device 114 can determine the motion sequence of each part of the human body based on the data of each motion measurement module received in real time.

In an embodiment, the synchronization may also be initiated by the terminal device 114, i.e., the terminal device 114 transmits a synchronization command to the receiving processor 600 and then the receiving processor 600 or the terminal device 114 transmits the synchronization command to all of the motion measurement modules, or the terminal device 114 transmits a synchronization command to all of the motion measurement modules directly to perform synchronization. According to the synchronization command, receiving processor 600 or the terminal device 114 can determine the motion sequence of each part of the human body and the sports appliance based on the data of each motion measurement module received in real time.

During implementation of the present disclosure, the motion information comprises three-dimensional orientations, trajectory, motion speeds and displacements, deviations between the actual motion orientations and the reference motion orientations, deviations between the actual motion trajectory and the reference trajectory, coordinated motion sequence, etc., of the human body and the sports appliance at all the time. The motion sequence of each part of the human body and the sports appliance includes: an order for an acceleration of each part of the human body and the sports appliance to reach a peak in a time axis, a time interval between the peaks, and an amplitude of the peak of the acceleration; an order for a velocity of each part of the human body and the sports appliance to reach a peak in a time axis, a time interval for reaching the peak, and an amplitude of the peak of the velocity; and an order for an angle of each part of the human body and the sports appliance to reach a peak in a time axis, a time interval between the peaks, and an amplitude of the peak of the angle.

During implementation of the present disclosure, the receiver unit 103 may display the trajectory in the preset reference motion information as a 3D graph, and display the trajectory in the motion information as a 3D graph. By displaying the target motion information (e.g., trajectory, motion sequence, etc., of the golf club or the human body) as a 3D graph on a display screen of the receiver unit 103, the user can slowly move and try to match his actual movement to the target motion information on the screen. The receiver unit 103 compares the measured swing motion data with the preset swing motion data, and provides an audio or other form of alert to the trainer according to a result of comparison. On the basis that the actual motion information is ensured to coincide with the target motion information, the user may gradually increase the motion speed, so that the actual motion information well coincides with the standard motion information under a normal motion speed, so as to establish an accurate movement and achieve a good training effect.

The hand-held sports appliance may be a golf club, a tennis racket, a badminton racket, a baseball bat, a squash racket, a hockey stick, etc., and the present disclosure only describes the golf club.

During implementation of the present disclosure, after a motion is completed, the user can view information of the just completed motion on the software interface of the receiver unit, such as trajectory of a certain part of the human body, trajectory of the sports appliance, motion speed of the human body or the sports appliance, orientation of the human body and the sports appliance at a certain time point, coordinated motion sequence of the human body and the sports appliance, etc., and the user can also view and compare the historical motion data. In order that the trajectory can be viewed more intuitively, some virtual auxiliary appliances (e.g., virtual laser, virtual plane, etc.) may be used at a man-machine interaction interface of receiver unit to assist the graph display. For example, a virtual laser may be mounted at one end of the sports appliance, thus through the laser projection on the ground, a trajectory of the golf club in the air and a trajectory of its projection on the ground in a golf swing are displayed clearly and intuitively, and a swing trajectory of the sports appliance in the air can be viewed intuitively. For example, during a golf swing motion, a laser may be mounted in a normal direction of a head plane of the golf club, so that the twisting of the golf club in the swing process can be viewed intuitively. The motion data may be locally stored, or shared through a network.

During implementation of the present disclosure, the motion measurement module may be bound to the hand-held sports appliance through a fixture or a mechanical integration. After the fixture is mounted and calibrated, any calibration procedure is no longer required for mounting the motion measurement module to the fixture. The motion measurement module may be bound to the human body through a sensor suit, a bandage or a combination thereof.

During implementation of the present disclosure, the whole process of a motion made by the user may be divided into different motion stages by several key frames. For example, regarding a golf swing motion, the key frames of the swing process include an initial club alignment, a top of backswing, an impact point of swing, etc. In addition to the key frames for dividing the motion stages, the whole process may further include some interested key frames, e.g., the two hands reach the horizontal positions during the swing, the lowest positions, etc. The key frames of the motion process may be determined through motion measurement modules according to the acceleration and the orientation information.

The key frames in the motion process are determined by a particular motion measurement module (e.g., a motion measurement module mounted on a hand-held sports appliance) or multiple motion measurement modules in real time by combining the measured data, and the system automatically completes the measurement and record of the whole motion process according to the detection of the key frames. The key frames may be determined according to information such as the acceleration and the static posture. For example, a key frame of initial club alignment may be determined according to the acceleration and the static posture.

During implementation of the application, the multi-node motion measurement and analysis system may further set a reference target motion orientation/motion sequence and a trajectory direction of the sports appliance. This can be done by adjusting a trajectory of a model on the software interface of the receiver unit, or directly loading the stored trajectory of the coach or other person. The reference target motion orientation/motion sequence may be manually set, or an actually captured motion orientation/motion sequence of the user or other person. The target trajectory direction of the sports appliance may be set by pressing corresponding button on the software interface of the receiver unit after horizontally placing the sports appliance or the motion measurement module on the ground along a target motion direction. The receiver unit can also record an orientation of the current hand-held sports appliance or the motion measurement module, and take the orientation as a reference for the subsequent trajectory direction.

Figure 10:
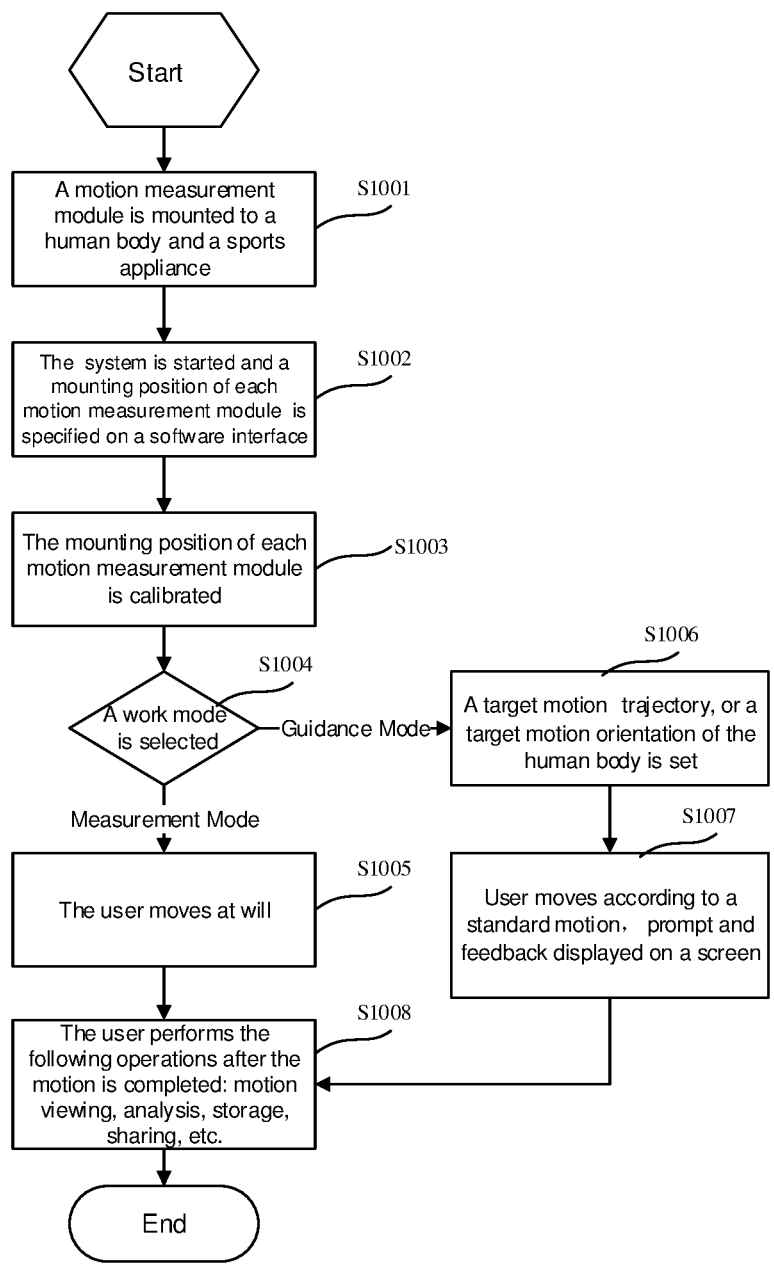
FIG. 10 is a usage flow chart of a multi-node motion measurement and analysis system according to an embodiment of the present disclosure.

FIG. 10 is a usage flow chart of a multi-node motion measurement and analysis system according to an embodiment of the present disclosure. As illustrated in FIG. 10, the flow comprises the following steps.

S1001: each motion measurement module is mounted to a human body and a sports appliance.

In an embodiment, the motion measurement module is mounted to the sports appliance in the manner of an adjustable and demountable fixture. The fixture may be fixedly mounted to sports appliances with different diameters. The motion measurement module can be conveniently mounted to a fixture, and conveniently demounted and mounted to a fixture of another sports appliance. The motion measurement module may be mounted to the human body through a bandage, a specific sensor suit or a combination thereof.

S1002: the system is started and a mounting position of each motion measurement module is specified.

After each motion measurement module is mounted and fixed, a power source of the motion measurement module and a power source of the receiver unit are turned on, then a connection between the receiver unit and the motion measurement module is established, and a mounting position of the motion measurement module is specified on a man-machine interaction interface of the receiver unit.

S1003: the mounting position of each motion measurement module is calibrated.

The calibration of the motion measurement module mounted to the sports appliance is achieved by calibrating a fixture being mounted, and the motion measurement module no longer needs to be calibrated when it is mounted to the fixture. When the motion measurement modules are mounted to the human body, their mounting positions on the human body shall be calibrated. Specifically, a series of calibration postures are performed according to the number and mounting positions of the motion measurement modules, so as to complete calibrations of the mounting positions and orientations.

S1004: a work mode of the motion measurement and analysis system is selected.

The motion measurement and analysis system has two work modes: one is a measurement mode, and the other is a guidance mode.

S1005: a measurement mode is performed.

Under the measurement mode, a user motions freely, and the motion measurement and analysis system captures the user's true movement for analysis and research. Under the guidance mode, standard motion information, such as standard motion sequence, trajectory, etc., of the human body and the sports appliance needs to be set; the user makes slow following exercises under the guidance of the standard motion information on the display screen, and then gradually increases the speed to the normal speed. The motion measurement and analysis system further provides feedback in real time according to the deviation between the captured user's actual motion and the reference motion.

S1006: a guidance mode is performed.

If the guidance mode is selected, a target motion direction of the sports appliance and standard motion information of the human body and the sports appliance can be set. The method for setting the target motion direction of the sports appliance may be as follows that the sports appliance or the motion measurement module is placed along the target motion direction, and then the setting is completed by pressing corresponding button on the software interface of the receiver unit. The method for setting the standard motion information of the sports appliance and the human body may be as follows that target orientation, trajectory, sequence, etc., are manually set and adjusted on the software interface of the receiver unit, or the captured actual motion information data of the user or other person is directly used as the target motion information.

Next, the user moves normally. In the motion process, each motion measurement module collects motion data (including acceleration, angular velocity, magnetic signal, etc.) of corresponding bound object, calculates a spatial orientation thereof, and transmits the collected data and a result of calculation to the receiver unit. According to the wirelessly received motion data of each motion measurement module, the receiver unit calculates information of the human body or the sports appliance, such as position, linear/angular velocity, orientation angle, motion sequence and trajectory.

S1007: the reference motion is followed.

If the current work mode is the guidance mode, the receiver unit displays the target motion information on the display screen as a 3D graph, and the user can slowly move so as to try to match his actual motion to the displayed standard motion information. The receiver unit also provides corresponding alert according to a deviation between the user's actual motion and the standard reference motion.

S1008: after the motion is completed, the user can view information of the just completed motion on the software interface of the receiver unit, such as trajectory of a certain part of the human body, trajectory of the sports appliance, orientation of the human body and the sports appliance at a certain time point, coordinated motion sequence of the human body and the sports appliance, etc., and the user can also view and compare the historical motion data. In order that the trajectory can be viewed more intuitively, some virtual auxiliary appliances (e.g., virtual laser, virtual plane, etc.) may be used at a man-machine interaction interface of the receiver unit to assist the graph display. For example, a virtual laser may be mounted at one end of the sports appliance, thus through the laser projection on the ground, a swing trajectory of the sports appliance in the air can be viewed intuitively. For example, during a golf swing motion, a laser may be mounted in a normal direction of a head plane of the golf club, so that the twisting of the golf club in the swing process can be viewed intuitively. The motion data may be locally stored, or shared through a network.

Next, the embodiments of the present disclosure will be described in details with reference to the examples of golf swing training.

1. Example of Two-Node Motion Measurement and Analysis System

In this embodiment, the motion measurement and analysis system includes two motion measurement modules and one smart hand-held device connected to each other through Bluetooth. One motion measurement module is mounted to a golf club through a fixture, and the other motion measurement module is bound to a wrist or other part such as a head or a back through a bandage or a sensor suit.

The smart hand-held device may be a hand-held device where corresponding terminal software is installed, like a smart phone, a palm computer, a tablet computer, etc. The smart hand-held device may be placed on the human body (e.g., pocket), or on the ground or a rack.

The microprocessor module in the motion measurement module can calculate an absolute spatial orientation (relative to the global coordinates) and a relative spatial displacement (relative to the initial position) of the motion measurement module, according to information measured by the sensor module, such as an acceleration, a magnetic force, an angular velocity, etc. The RF module in the motion measurement module wirelessly transmits the data originally measured by the sensor and result data of calculation to the smart hand-held device. According to the received data, the smart hand-held device can calculate some derived swing motion data, such as the hitting speed and angle, and the motion sequence of the hitting body and the golf club.

When the two-node motion measurement and analysis system is to be performed, a fixture of the motion measurement module is mounted to the golf club, and if multiple golf clubs are required, each golf club may be mounted with a fixture. The mounting position of the fixture shall be aligned during a mounting of the fixture. One motion measurement module is snap-jointed to the fixture of the golf club to be used. The other motion measurement module is bound to a certain part of the human body, such as a wrist, through a bandage or a sensor suit. The power source of the two sensors are turned on, and the motion measurement modules enter an energy saving standby mode after the power source is turned on. Corresponding terminal software of the smart hand-held device is started to select a golf club to be used, to specify a mounting position of the motion measurement module to be mounted on the human body, and establish a wireless communication connection between the smart hand-held device and the motion measurement module. After the connection is established, the motion measurement module enters the work mode. The motion measurement module can indicate different work states thereof with an indicator lamp. For example under the standby mode, the indicator lamp blinks slowly; during the establishment of a connection, the indicator lamp blinks quickly; and after a connection is established, the motion measurement module enters the work mode and the indicator lamp keeps on.

After the connection between the smart hand-held device and motion measurement module is established, a calibration of the mounting position of the motion measurement module mounted to the human body shall be performed. For example, if the motion measurement module is mounted to the wrist, the terminal device requires the user horizontally extending the hand forward with the palm down. After the calibration is performed according to the instruction of the smart hand-held device, any correction is no longer required before the mounting position of the sensor is changed.

Next, a target hitting direction can be set, for example by horizontally placing the golf club in a hitting direction, and then pressing a button for setting the target hitting direction on a terminal software interface of the smart hand-held device. The terminal software stores a golf club direction of the motion measurement module on the golf club, takes it as the target hitting direction, and compares the target hitting direction with the actual hitting trajectory in the subsequent display. In addition, target angles of the golf club at some key points during the golf swing may be set, such as a top angle of the golf club during a backswing.

The above steps of setting the target hitting direction and the target golf club orientation are optional, i.e., a measurement of the golf swing motion can be directly made after the sensor is mounted and calibrated.

Before a golf swing, the player generally will align the head of the golf club with the ball, and the motion measurement module will detect such action. Once the action is detected, the spatial orientation of the motion measurement module will be automatically calibrated in the alignment process. The specific calibration method is to acquire an absolute spatial orientation of the motion measurement module according to measured signals of the magnetometer and the accelerometer, and takes it as the calculated spatial orientation of the motion measurement module. After the calibration is completed, the motion measurement modules transmit a control command to the smart hand-held device, which provides an instruction tone and transmits a synchronization command to the two motion measurement modules to start data recording at the same time. After receiving the synchronization command, the motion measurement module resets indexes of the data transmitted by themselves. If the smart hand-held device receives the motion measurement data of the same index, it means that the group of data is collected at the same time.

The motion measurement and analysis system of the present disclosure can detect the hitting event. The detection method is to determine that a hitting event happens if an acceleration within a preset range is detected as suddenly changed after an alignment event occurs. If a hitting event is detected, the motion measurement module also transmits a control command to the smart hand-held device, which stores data between the two events (alignment and hitting), and calculates derived data such as flying trajectory and distance of the ball, swinging power proportion, etc., according to those data, and finishes the data recording and storage. If the motion measurement module does not detect any event (alignment event and hitting event) in a certain period of time, it automatically enters the standby state to save energy. Some players may perform several alignment actions before hitting the ball, and the smart hand-held device takes the last alignment action before hitting the ball as the alignment event. Through the detection of some events, the club/bat swing auxiliary training apparatus automatically completes the automatic measurement control of the swing process without needing any additional auxiliary apparatus or control action. If a target hitting direction is not set in the previous step, the smart hand-held device takes a normal direction of the head plane of the golf club when the alignment event occurs as the target hitting direction.

If a target golf club orientation in the swing process is set in the previous step, the smart hand-held device gives corresponding instruction in the swing process. For example, the smart hand-held device gives a instruction tone indicating a down swing when the angle of the golf club reaches a preset top angle during a backswing.

After the process of swing and hitting is completed, the player can view and analyze the just finished swing action on the smart hand-held device. The smart hand-held device displays a trajectory of the golf club, a hitting angle and speed, a reference flying trajectory of the ball, a coordinated motion sequence of the human body and the golf club, etc., in the swing process through a graph. In order to view the movement of the golf club more intuitively, a virtual laser may be mounted at one end of the golf club on a graph interface of the smart hand-held device, thus through the laser projection on the ground, a swing trajectory of the golf club in the air can be viewed intuitively. A laser may also be mounted in a normal direction of a head plane of the golf club, so that the twisting of the golf club in the swing process can be viewed intuitively. If the motion measurement module is mounted to a wrist, a trajectory of the wrist and a change trajectory of a hand gripping angle can be viewed. If the motion measurement module is mounted to a head, a trajectory of head twisting and pitching can be viewed. If the motion measurement module is mounted to a trunk, a body twisting trajectory can be viewed. By changing the mounting position of the motion measurement module on the human body, a motion sequence diagram of the golf club and corresponding part of the human body can be obtained, and by analyzing the motion sequence diagram of the golf club and different parts of the human body, a player can judge whether a force exerting order of his body is correct, so as to make an improvement according to a result of analysis.

2. Example of Multi-Node Half-Body Motion Measurement and Analysis System

In this embodiment, the multi-node half-body motion measurement and analysis system comprises twelve motion measurement modules, one receiving processor module and one terminal device. The multi-node half-body motion measurement and analysis system binds one motion measurement module to the golf club, and binds eleven motion measurement modules to the half body (e.g., hands, upper arms, lower arms, shoulders, head, back, hip, etc. of the upper body), thus it can measure the motions of the golf club and the half body at the same time. The receiving processor module wirelessly communicates with each motion measurement module. The receiving processor module comprises a wireless receiving antenna so that the trainer performs a good wireless communication while moving within a certain range. The receiving processor module wirelessly receives and transmits motion measurement data of each motion measurement module to the terminal device. The terminal device is a PC or a tablet computer. The receiving processor module transmits data to the terminal device via a USB and obtains power from the terminal device via the USB. The terminal device processes and calculates the motion measurement data transmitted from the receiving processor module, so as to obtain useful motion information of the human body and the sports appliance, including trajectory, orientation, speed, motion sequence, etc. of the human body and the sports appliance. The terminal device also displays the motion data through a graph or digits. The terminal device further stores standard reference motion information to provide a guidance to the motion of the human body.

A multi-node half-body motion measurement and analysis system is used, the eleven modules are bound to corresponding parts of the human body in a specified order; otherwise an actual mounting mode shall be set on the interface of the terminal device. The power source for each module is turned on, corresponding motion measurement terminal software is started on the terminal device, data such as body height, arm span and hip height of the trainer is input to the software, and a connection between the software and the motion measurement module is established.

After the connection is completed, the receiving processor module performs a synchronization process of the motion measurement modules. Specifically, the receiving processor module issues a synchronization command to all of the motion measurement modules, which reset indexes of the transmitted data simultaneously after receiving the command. After the synchronization is completed, a calibration of mounting error of each motion module on the human body may be carried out; the trainer orderly makes the specified calibration postures or actions, such as T posture, a posture of natural standing, and an action of moving hands, according to instructions of the software. The terminal device corrects the mounting error of each module and the size deviation of each part of the human body according to orientations of the human body, so as to accurately measure the motion data of the human body. Next, the last motion measurement module is mounted to a specified position on the golf club through a fixture, and corresponding golf club is selected on the terminal device.

In the training, if the work mode of the system is selected as the guidance mode, the standard motion information of the human body and the target hitting trajectory can be set based on standard swing motion data downloaded through the network, or can be set based on the user's captured actual motion data. Finally, the normal swing training can be carried out. In the swing process, the motion measurement module also detects the alignment event and hitting event, so as to automatically capture and record data of the swing process.

In the training, if the work mode is selected as the guidance mode, the terminal device displays the target motion information (e.g., trajectory, motion sequence, etc. of the golf club or the human body) as a 3D graph on a display screen, and the user can slowly move so as to try to match his actual motion with the target motion information on the screen. The terminal device compares the measured swing motion data with the preset swing motion data, and provides an audio or other form of alert to the trainer according to a result of comparison. On the basis that the actual motion information is ensured to coincide with the target motion information, the user may gradually increase the motion speed, so that the actual motion information well coincides with the standard motion information under a normal motion speed, so as to establish an accurate movement and achieve a good training effect.

In this embodiment, each motion measurement module bound to the human body may be removed and mounted to a new position. For example, modules on the hand, the upper arm and the lower arm may be removed and mounted to the foot, the shank and the thigh, so that a measurement and a motion guidance can be made to the motion of the lower body and the trunk. Thus, the motion measurement and guidance for the whole body can be completed under the condition that the number of the motion measurement modules is small and the cost is low.

A person skilled in the art shall appreciate that the embodiments of the present disclosure may be provided as a method, a system, or a computer program product. Thus the present disclosure may adopt the form of complete hardware embodiment, complete software embodiment, or software and hardware combined embodiment. In addition, the present disclosure may adopt the form of a computer program product which is implementable in one or more computer readable storage mediums (including, but not limited to, magnetic disk memory, CD-ROM, optical memory, etc.) containing computer readable program codes therein.

The present disclosure is described with reference to the flowcharts and/or block diagrams of the method, device (system) and computer program product according to the embodiments of the present disclosure. It shall be appreciated that each flow and/or block in the flowchart and/or block diagram, and the combinations of the flows and/or blocks in the flowchart and/or block diagram can be implemented through computer program instructions. The computer program instructions may be provided to a general computer, a dedicated computer, an embedded processor or a processor of other programmable data processing device, to form a machine so that the instructions, which are executed through the computer or the processor of other programmable data processing device, generate means for realizing the functions specified in one or more flows in the flowchart and one or more blocks in the block diagram.

The computer program instructions may also be stored in a computer readable memory which is capable of guiding the computer or other programmable data processing device to work in a specific mode, so that the instructions stored in the computer readable memory generate a product including instructing means for realizing the functions specified in one or more flows in the flowchart and/or one or more blocks in the block diagram.

The computer program instructions may also be loaded to the computer or other programmable data processing device, so that a series of operation steps can be performed in the computer or other programmable device to generate a processing realized by the computer, thus the instructions executed in the computer or other programmable device provide the steps for realizing the functions specified in one or more flows in the flowchart and/or one or more blocks in the block diagram.

The principle and implementations of the present disclosure are described through the specific embodiments, but the above descriptions of the embodiments just promote the understanding of the method and the core idea of the present disclosure. Meanwhile, a person skilled in the art can also modify the implementation and the application range according to the idea of the present disclosure. In summary, the content of the Specification shall not be understood as limitations to the present disclosure.

What is claimed is:

1. A multi-node motion measurement and analysis system, comprising:
   at least two motion measurement modules and a receiver unit;
   each motion measurement module comprises:
   a sensor module configured to measure information of acceleration and angular velocity of the motion measurement module;
   a first microprocessor module connected to the sensor module and configured to generate information of orientation according to the information of acceleration and angular velocity; and
   a first RF module connected to the first microprocessor module and configured to receive the information of acceleration, angular velocity and orientation and transmit the received information to the receiver unit;
   the receiver unit receives the information of acceleration, angular velocity and orientation transmitted from the first RF module in each motion measurement module to generate motion information according thereto,
   and wherein one motion measurement module being bound to a sports appliance through an adjustable fixture, other motion measurement module(s) being bound to the human body, and a binding position on a human body being rearrangeable based on different measurement modes;
   and wherein one of the motion measurement modules transmits a time synchronization command to other motion measurement module or modules.

2. The multi-node motion measurement and analysis system according to claim 1, wherein the receiver unit transmits a time synchronization command to each motion measurement module.

3. The multi-node motion measurement and analysis system according to claim 2, wherein the receiver unit determines a motion sequence of each part of the human body and the sports appliance, according to data of each motion measurement module received in real time.

4. The multi-node motion measurement and analysis system according to claim 3, wherein the motion sequence of each part of the human body and the sports appliance comprises a priority order for an acceleration of each part of the human body and the sports appliance to reach a peak in a time axis, a time interval for reaching the peak, and an amplitude of the peak of the acceleration; a priority order for a velocity of each part of the human body and the sports appliance to reach a peak in a time axis, a time interval for reaching the peak, and an amplitude of the peak of the velocity; and a priority order for an angle of each part of the human body and the sports appliance to reach a peak in a time axis, a time interval for reaching the peak, and an amplitude of the peak of the angle.

5. The multi-node motion measurement and analysis system according to claim 1, wherein the sensor module comprises:
   a tri-axial MEMS micro accelerometer configured to measure an acceleration of the motion measurement module; and a tri-axial MEMS micro gyroscope configured to measure an angular velocity of the motion measurement module.

6. The multi-node motion measurement and analysis system according to claim 5, wherein the sensor module comprises a tri-axial MEMS micro magnetometer configured to measure a magnetic force of the motion measurement module.

7. The multi-node motion measurement and analysis system according to claim 6, wherein the first microprocessor module is specifically configured to calculate and generate a static three-dimensional orientation angle of the motion measurement module according to an acceleration vector measured by the tri-axial MEMS micro accelerometer and a magnetic vector measured by the tri-axial MEMS magnetometer; configured to calculate and generate a dynamic three-dimensional orientation angle of the motion measurement module according to an angular velocity measured by the tri-axial MEMS micro gyroscope; and configured to correct the dynamic three-dimensional orientation angle according to the static three-dimensional orientation angle to obtain information of orientation of the motion measurement module.

8. The multi-node motion measurement and analysis system according to claim 1, wherein the receiver unit determines a motion sequence of each part of the human body and the sports appliance, according to data of each motion measurement module received in real time.

9. The multi-node motion measurement and analysis system according to claim 8, wherein the motion sequence of each part of the human body and the sports appliance comprises a priority order for an acceleration of each part of the human body and the sports appliance to reach a peak in a time axis, a time interval for reaching the peak, and an amplitude of the peak of the acceleration; a priority order for a velocity of each part of the human body and the sports appliance to reach a peak in a time axis, a time interval for reaching the peak, and an amplitude of the peak of the velocity; and a priority order for an angle of each part of the human body and the sports appliance to reach a peak in a time axis, a time interval for reaching the peak, and an amplitude of the peak of the angle.

10. The multi-node motion measurement and analysis system according to claim 1, wherein the receiver unit is further configured to display a trajectory in preset reference motion information as a 3D graph, and display a trajectory in the motion information as a 3D graph.

11. The multi-node motion measurement and analysis system according to claim 1, wherein a virtual laser is provided on the sports appliance to intuitively display a trajectory of the sports appliance.

12. The multi-node motion measurement and analysis system according to claim 1, wherein the number of the motion measurement modules bound to the human body is updated according to different measurement modes.

* * * * *